United States Patent Office 3,511,883
Patented May 12, 1970

---

3,511,883
PROCESS FOR THE PREPARATION OF PERFLUOROINDANE AND PERFLUOROSTYRENE
Angelo Bergomi, John Colin Tatlow, and Jim Burdon, Milan, Italy, assignors to Montecatini Edison S.p.A., Milan, Italy, a corporation of Italy
No Drawing. Filed Nov. 2, 1967, Ser. No. 680,017
Claims priority, application Italy, Nov. 16, 1966, 29,996/66
Int. Cl. C07c *17/24, 25/28, 25/22*
U.S. Cl. 260—650        7 Claims

ABSTRACT OF THE DISCLOSURE

A process for making perfluoroindane ($C_9F_{10}$) and perfluorostyrene ($C_8F_8$) wherein dimeric hexafluorocyclopentadiene is subjected to pyrolysis in vapor phase over a solid-packed reaction zone containing alkali or alkaline-earth fluorides as the packing material, in a molar ratio to an inert gas (e.g. nitrogen) between 0.2 and 0.8 (preferably 0.3 to 0.7) for a residence time of 0.01 to 0.1 second to 0.1 second (preferably about 0.05 second) at a temperature of 400° to 700° C. (preferably 500° to 670° C.).

---

Our present invention relates to the preparation of highly fluorinated aromatic-ring compounds and especially perfluoroindane and perfluorostyrene.

It has already been proposed to produce perfluoroindane, a compound having the general formula $C_9F_{10}$ and an apparent structural formula

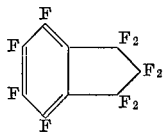

(1)

as well as perfluorostyrene whose structural formula is $C_8F_8$ and apparent structural formula

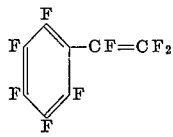

(2)

by the defluorination of perfluorinated alicyclic (i.e. saturated) compounds of corresponding chain lengths and ring formation, e.g. perfluoroperhydroindane and perfluoroethylcyclohexane, by passing the alicyclic compound over a defluorination catalyst (e.g. nickel or iron oxide) at elevated temperatures. This process has, however, the disadvantage that high conversions cannot be attained without substantial degradation of the product desired or of the starting organic compound. In addition, regeneration of the defluorination catalyst is difficult and expensive.

It is, therefore, the principal object of the present invention to provide an improved process for making perfluoroindane and perfluorostyrene.

We have now found that it is possible to obtain mixtures of perfluoroindane and perfluorostyrene (having the Formulas 1 and 2 as given above) by a relatively simple and inexpensive reaction, with excellent conversion ratios and selectivity toward the desired products, when dimeric hexafluorocyclopentadiene is pyrolyzed at temperatures between 400° and 700° C. by passing the dimeric hexafluorocyclopentadiene over a solid packing at these temperatures with a residence time ranging from 0.01 to 0.1 second. The "residence time" as used herein is defined as the ratio between the free volume of the reaction zone and the flow rate of the reacting gas mixture with the "volume" units being identical. It has been found that this process gives rise to perfluoroindane and perfluorostyrene without substantial degradation of the organic styrene material, does not require special catalysts which necessitate rejuvenation or have a tendency toward positioning and are based upon rare or expensive metals, results in a high yield and good conversion ratio, and can be carried out in a relatively inexpensive and efficient manner without detrimental effects from temperature variations. The apparatus for carrying out this process may be an ordinary packed column and thus, in turn, is relatively inexpensive.

The dimeric hexafluorocyclopentadiene used as the raw material of the present process is, according to a more specific feature of the present invention, formed spontaneously from the hexafluorocyclopentadiene as it is vaporized into a stream of nitrogen or other inert gas (e.g. one of the rare gases, such as helium, argon, neon) with a molar ratio of the dimer to the inert gas ranging from substantially 0.2 to 0.8, preferably 0.3 to 0.7.

According to a specific feature of this invention, the dimer is passed in a stream of nitrogen through a reaction chamber, preferably of the packed type, in the indicated temperature and residence time with a molar ratio of the dimer to the nitrogen whose outer limits are 0.1 to 0.9. The dimer is a waxy polyenic or unsaturated material having a melting point of 41 to 42° C. and formed spontaneously from hexafluorocyclopentadiene. Preferably, the packing materials are alkali or alkaline-earth metal fluorides; sodium fluoride is most advantageous.

The perfluoroindane (Formula 1) and perfluorostyrene (Formula 2) are compounds of known utility. The perfluorostyrene is polymerizable using conventional styrene polymerization techniques to use polyfluorostyrene of high molecular weight and thermal stability. The liquids are dielectric fluids adapted to be used in electrical devices (transformers, capacitors, and the like), have relatively efficient heat-transfer capabilities so that they are used as heat-transfer fluids in heat-exchange situations and are excellent lubricating oils at elevated temperatures. Perfluoroindane and perfluorostyrene can serve as intermediates in the degradation synthesis of perfluorocyclobutane, hexafluorobenzene and the like, and can be used for heat transfer and dielectric purposes and other synthesis reaction in which fluorine saturated alkylbenzenes participate.

According to a particular embodiment of the present invention, the dimer of hexafluorocyclopentadiene, vaporized in a stream of nitrogen or other inert gases, with a molar ratio of the dimer with respect to the nitrogen ranging from 0.2 to 0.8, is fed into a nickel tube packed with an inert material made of silica or carborundum granules or iron gauze at temperatures ranging from 450° to 700° C. The flow rate of the gaseous mixture is adjusted so that the residence time of the mixture in the reaction zone is within 0.01 and 0.1 second. The effluent gases consist of perfluoroindane, perfluorostyrene and unreacted dimeric hexafluorocyclopentadiene.

Alternatively, the nickel reactor is packed with sodium fluoride. The salt can be pellets, granules, or powder; it can be supported over an inert material, or it can be used without any support. The reactor is kept at a constant temperature, between 400° and 700° C. The dimer of heaxfluorocyclopentadiene vaporized in a stream of nitrogen or other inert gases, with a molar ratio of the dimer to the nitrogen ranging from 0.1 to 0.9 is then fed into the reactor. The effluent gases consist of perfluoroindane, perfluorostyrene and unreacted dimer of hexafluorocyclopentadiene. The reaction mixture is resolved into its constituent compounds by preparative gas chromatography.

As noted previously, the reaction is favored by the fluorides of alkali or alkaline-earth metals, the degree of conversion of the starting material is satisfactory at a temperature of about 400° C. This temperature, when operating without any metal fluoride, represents the lower limit of the temperature range. In our process NaF, LiF, KF, $CaF_2$, $BaF_2$ and $SrF_2$ are particularly effective: among these fluorides, NaF proved to be the most suitable. The reaction temperature should be between 500° and 670° C. The residence time and/or the concentration of the starting material in the vapor phase are related to the reaction temperature. More particularly, if the temperature is raised it is convenient to reduce the residence time of the gaseous mixture in the reaction zone and/or the concentration of the organic material in order to avoid or at least to reduce the degradation of the organic material. On the contrary when operating at comparatively lower temperatures the residence time of the organic material in the reaction zone and/or the concentration of the organic material in the vapor phase can be comparatively higher. The process according to this invention is run at atmospheric pressure.

EXAMPLE I

The dimer of hexafluorocyclopentadiene (2.5 grams), vaporized in a nitrogen stream, is fed into a nickel tube packed with sodium fluoride pellets and heated at 650° C. The molar ratio of the dimer to the nitrogen is about 0.3. The residence time of the gaseous mixture in the reaction zone is about 0.1 second. After about 15 minutes of reaction the 2.4 grams products are collected in a container cooled with liquid air, by condensation of the gases flowing out of the reactor; the recovered material is analyzed by means of preparative gas chromatography. The product mixture consists of perfluoroindane (52 molepercent based on the starting material), and of perfluorostyrene (15.8 mole percent based on the starting material), the residue being constituted by degradation products such as tetrafluoroethylene, octafluorocyclobutane, hexafluorobenzene and other, unidentified products. The conversion of the dimer is quantitative.

EXAMPLE II

The dimer of hexafluorocyclopentadiene (2.5 g.), vaporized in a nitrogen stream, is fed into the same apparatus as in Example I, packed with iron gauze and heated to 670° C. The molar ratio of the dimer to the nitrogen is about 0.5. The residence time of the gaseous mixture in the reaction zone is about 0.05 second.

The gases flowing out of the reactor are condensed in a container cooled with liquid air and analyzed by means of preparative gas chromatography. 2.3 grams of a product mixture is obtained, consisting of perfluoroindane, perfluorostyrene and by-products of major degradation, such as tetrafluoroethylene, octafluorocyclobutane and other unidentified products. The conversion of the dimer is quantitative. The yield based on the starting material, is respectively 43.4 mole-percent of perfluoroindane and 27.1 mole-percent of perfluorostyrene.

EXAMPLE III

The dimer of hexafluorocyclopentadiene (0.6 gram), vaporized in a nitrogen stream, is fed into a nickel tube packed with sodium fluoride pellets and heated to 500° C. The molar ratio of the dimer to the nitrogen is about 0.7 and the residence time of the gaseous mixture in the reaction zone is about 0.02 second. The obtained products (0.5 gram) were collected in a container cooled with liquid air and analyzed by preparative chromatography. The product mixture consists of perfluoroindane, a small amount of perfluorostyrene (less than 0.5 mole percent) and unreacted dimer. The yield in perfluoroindane is about 49.75 mole percent with respect to the starting material. The conversion of the starting dimer amounted to 50.25%.

EXAMPLE IV

The dimer of hexafluorocyclopentadiene (2.5 grams) vaporized in a nitrogen stream is fed into a nickel tube, heated to 670° C., in absence of any packing. The molar ratio of the dimer to the nitrogen is about 0.5 and the residence time of the gaseous mixture in the reaction zone is 0.07 second.

The gases flowing out the reactor were condensed in a container cooled with liquid air and 2.3 grams of a mixture of products were obtained which we analyzed by preparative chromatography. The reaction mixture consists of perfluoroindane, 30% in moles (yield based on the starting material) and perfluorostyrene (10% in olar terms), tetrafluoroethylene, octafluorocyclobutane and other, unidentified, products besides a substantial amount of the unreacted dimer of hexafluorocyclopentadiene. The conversion of the dimer was about 75%.

We claim:

1. A method of making perfluoroindane or perfluorostyrene, comprising the step of pyrolyzing dimeric hexafluorocyclopentadiene by passing it in a vapor phase through a packed reaction zone at a temperature between 400° C. and 700° C. with a residence time in the reaction zone of 0.01 to 0.1 second, the residence time being the ratio of the free volume of said zone to the volume rate of flow of said dimeric hexafluorocyclopentadiene therethrough, and combining the vapor of the dimeric hexafluorocyclopentadiene with at least one inert gas prior to passing it through said zone, the molar ratio of dimeric hexafluorocyclopentadiene to said inert gas ranging from substantially 0.2 to 0.8.

2. The process defined in claim 1 wherein said zone contains a packing consisting essentially of alkali and alkaline-earth fluorides.

3. The process defined in claim 2 wherein said packing contains sodium fluoride.

4. The process defined in claim 2 wherein the temperature of said reaction zone ranges between substantially 500° to 670° C.

5. The process defined in claim 2 wherein said dimeric hexafluorocyclopentadiene is mixed with an inert gas in a molar ratio of 0.3 to 0.7 prior to passage through said zone.

6. The process defined in claim 5 wherein the residence time of the mixture of said dimeric hexafluorocyclopentadiene with said inert gas is about 0.05 second.

7. The process defined in claim 6 wherein said inert gas is nitrogen.

References Cited

Banks et al.: J. Chem. Soc., C. 1966 (22) 2102–2106. Copy in P.O. Search Center, Call No. QD1.C6.

DANIEL D. HORWITZ, Primary Examiner

U.S. Cl. X.R.

260—651